Figure 1:
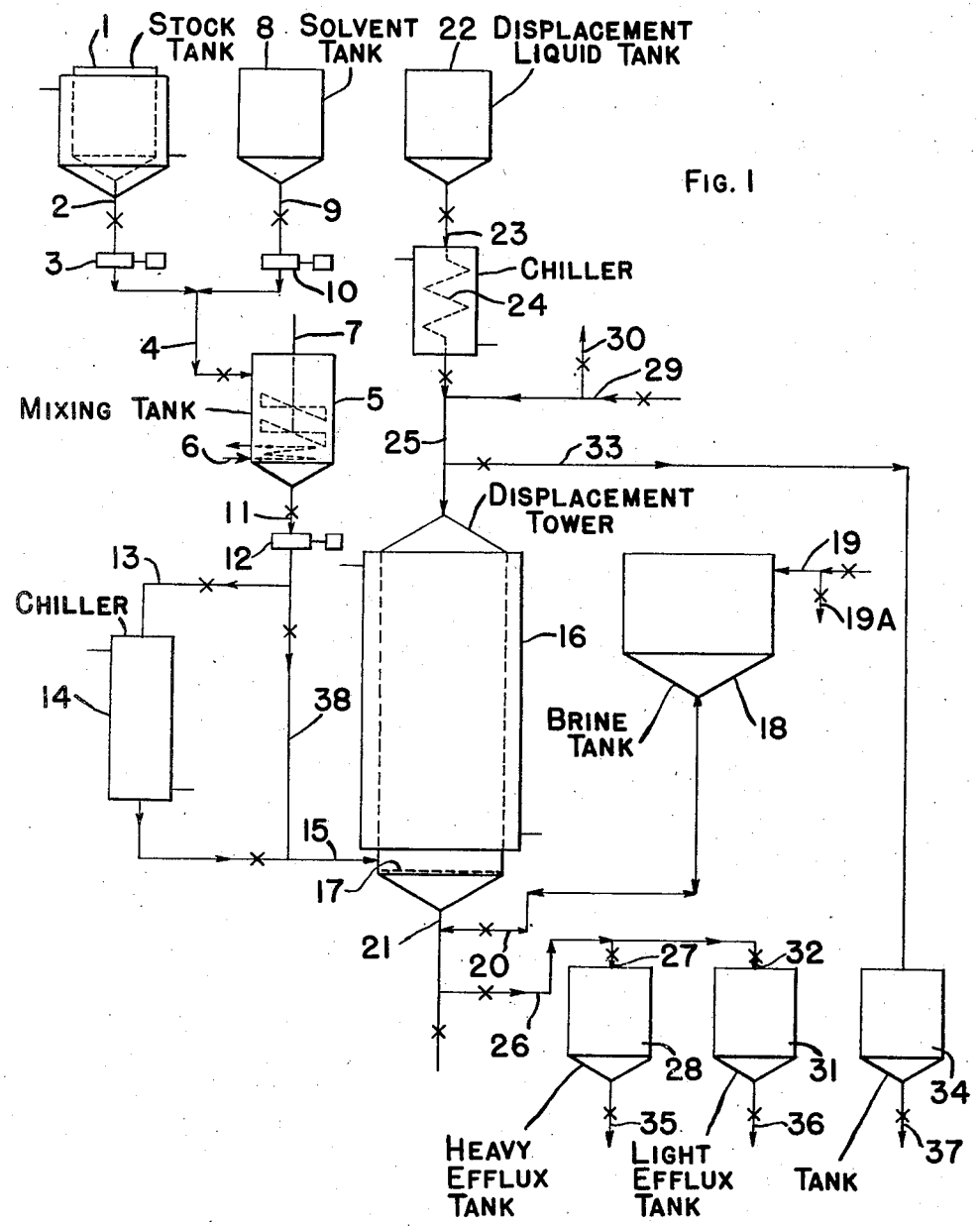

June 27, 1939.  J. H. BOYD, JR  2,163,581
PURIFICATION OF CRYSTALLIZABLE DERIVATIVES OF COAL TAR
Filed July 18, 1936   2 Sheets-Sheet 1

INVENTOR
JAMES H. BOYD JR.
BY T. Wallace Irwin
HIS ATTORNEY

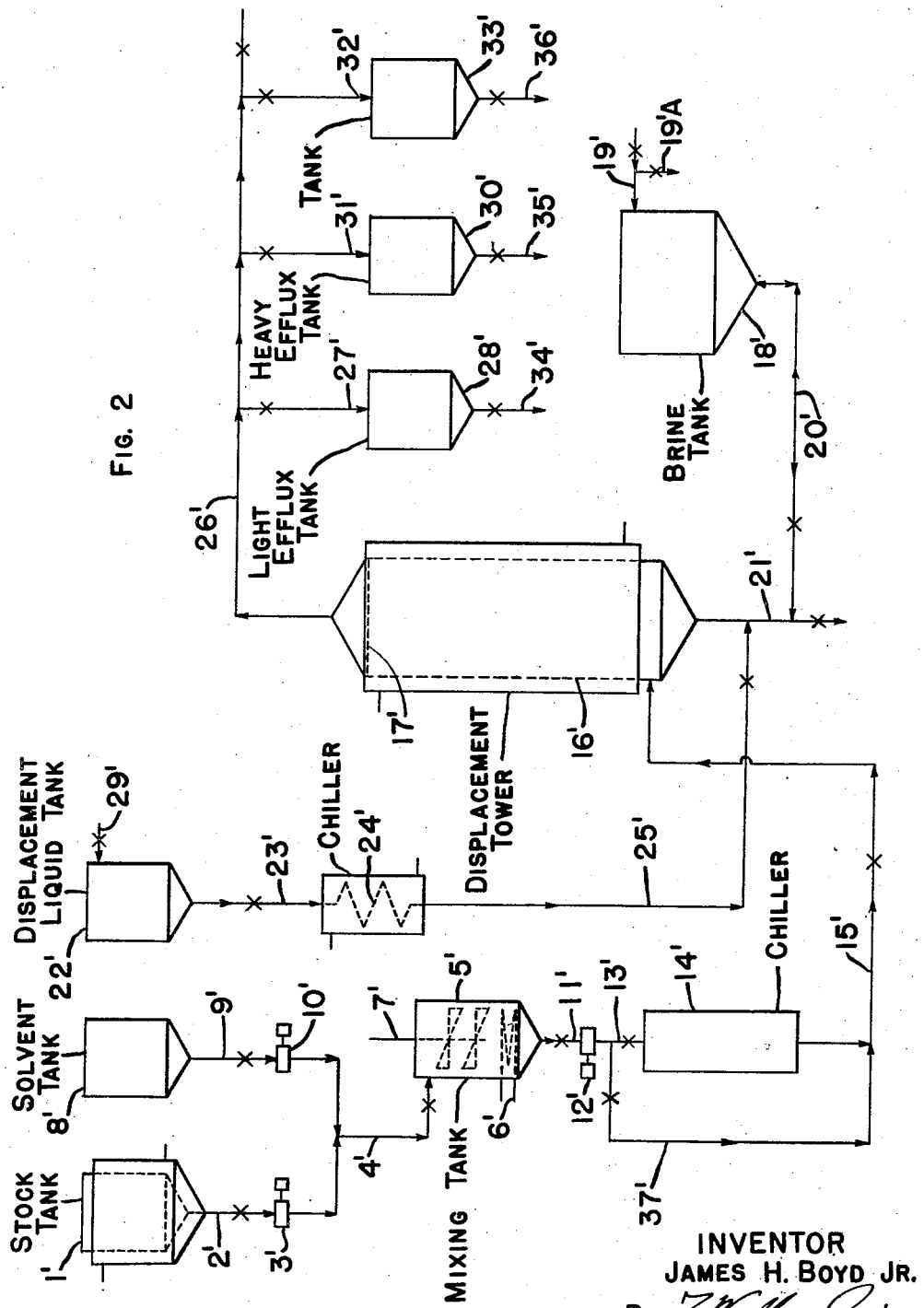

Patented June 27, 1939

2,163,581

UNITED STATES PATENT OFFICE 2,163,581

PURIFICATION OF CRYSTALLIZABLE DERIVATIVES OF COAL TAR

James H. Boyd, Jr., Philadelphia, Pa., assignor to The Atlantic Refining Company, Philadelphia, Pa., a corporation of Pennsylvania Application July 18, 1936, Serial No. 91,266

8 Claims. (Cl. 196—1)

The present invention relates to the purification of crystallizable derivatives of tar, and relates more particularly to treatment of coal tar derivatives such as naphthalene, anthracene, phenanthrene and carbazole for the removal therefrom of undesirable oils, tarry materials, color-bodies and the like.

A principal object of this invention is the purification of crystallizable derivatives of coal tar by means of solvents which have a limited solvent power for said derivatives but which will retain undesirable impurities in solution at the temperature at which the treatment may be effected.

A further object of this invention is the purification of crystallizable derivatives of coal tar by means of solvents, wherein such purification may be effected with the utilization of relatively small quantities of inexpensive and easily-recoverable solvents.

A further object of this invention is the solvent treatment of crude naphthalene, creosote oil and anthracene oil for the recovery therefrom of naphthalene, anthracene, phenanthrene and the like, substantially free of undesirable oils and color-bodies.

Heretofore it has been common practice to effect the separation of oils from crude naphthalene by pressing or centrifuging. For example, crude naphthalene, as it comes from the first centrifuging, has a melting point of 70° C. to 76° C. and contains from about 20% to about 30% of oil. This crude material may be hot-pressed in hydraulic presses at pressures up to 2 tons per sq. in., giving a partially purified naphthalene melting at about 77° C. to 78° C. and containing from 1% to 3% of oil. Or, the same result may be obtained by remelting the crude naphthalene, allowing it to cool and re-crystallize, and then centrifuging. After all of the oil that will separate in the centrifuge has been expelled, the naphthalene is washed with a spray of warm water to remove mechanically held oil. The resulting product melts at about 78° C. and is known as purified naphthalene. The further treatment of the purified naphthalene consists in a distillation, should the naphthalene still contain color-bodies and tarry material. The distilled product is thereafter subjected to washing with sulfuric acid, with settling and removal of sludge between the successive washes. The acid washing is followed by water washing to remove excess acid and finally by washing with caustic soda solution. As a final step, the washed naphthalene is redistilled or sublimed, the bulk of the distillate being refined naphthalene in a marketable form.

It will be seen that in accordance with the prior practice, a plurality of steps involving pressing, centrifuging, acid treatment and distillation are required in order to convert crude naphthalene into a desirable and marketable product. However, in accordance with my invention, I am able to render crystallizable derivatives of coal tar, for example, naphthalene, substantially free of oil, color-bodies and tarry material by a single and economical treatment with solvents.

Briefly, my invention consists in the treatment of crystallizable derivatives of coal tar, in accordance with the following steps, and the term "crystallizable derivative" will be understood to comprehend naphthalene, anthracene, phenanthrene, carbazole and the like.

(1) The dilution of coal tar products such as crude naphthalene, creosote oil, or other tar distillates containing crystallizable derivatives with a solvent which, at elevated temperatures, will dissolve the tar products substantially entirely, and which at reduced temperatures, will retain only the tarry materials, oils and other impurities in solution, while permitting the crystallizable derivatives to crystallize.

(2) The adjustment of the temperature, i. e., the cooling of the diluted mixture or solution to the desired separation temperature, with or without agitation, in such a manner as to effect crystallization and dispersion of the crystallizable derivative thruout the solution with reasonable uniformity. If agitation is resorted to, the cooled solution or mother liquor containing the crystallized derivative is thereafter preferably permitted to stand, unagitated, for sufficient time to effect the formation of a highly porous crystalline mass, the structure of which has appreciable mechanical strength or cohesion, such mass containing not more than substantially 40% of crystallized derivative per unit volume of the mass.

(3) The displacement of the solution or mother liquor from the chilled crystalline mass by a displacing or washing liquid, preferably a solvent for oils and tarry materials, without substantial agitation and under a low differential pressure, in such a manner that a substantially horizontal interface is maintained between the solution and the washing liquid, with suitable gravity differential between the solution and the washing liquid contributing substantially to the maintenance of such horizontal interface.

(4) The recovery of the crystallizable derivative, and the separation of the oil and tarry materials from the solvent and/or displacing liquid resulting from the third step of my process.

An important feature in the successful operation of my process and the various modifications thereof, is the limitation of the volume occupied by the crystals in the mass during the removal of the solution from such mass. To this end, careful adjustment of the concentration of crystalline derivative in the solution, the gravity differentials between crystals, solution and displacing liquid, and/or the differential pressures employed in the displacement, is expedient.

In carrying out my process, it is necessary to control the quantity of crystals in the solution so that the crystalline content of the mass resulting from the chilling of the solution will not exceed substantially 40% of any unit volume of the mass at the beginning of the displacing operation. In most instances, it has been found that the crystalline derivative contained in the mass at the beginning of the displacement step should be of the order of from 5% to 30% by volume, and preferably of the order of from 10% to 25% by volume; it may, however, be as high as substantially 40% by volume depending upon the character of the crystals, harder and larger crystals tending to permit higher concentrations. Should the crystalline content of the mass exceed substantially 40% by volume of said mass from which the solution of impurities is to be displaced, the crystalline particles will be so compacted together that the passages between them filled with solution will be too restricted to permit the displacement of the solution at the preferred low differential pressures. However, during the displacement and/or washing operation, some compacting of the crystals is to be expected, and at the completion of the said operation the concentration of crystalline material in the washed mass may be of the order of 50% by volume, depending upon the degree of compacting caused by the displacement step. If the concentration of crystals in the mass is so great as to render the mass too dense, it will be necessary to employ an undesirably high differential pressure to effect displacement of the solution from the mass, with the result that the displacing liquid will tend to flow more rapidly through any cracks or areas of low crystal content than through the main body of the mass, thereby causing unequal displacement of the solution and yielding a final product containing residual oils or tarry material. By maintaining a low concentration of crystals, the pressure required to cause the displacing liquid to pass through the mass is low; and when a wash liquid of different specific gravity than that of the solution is used, the tendency of the displacing liquid to flow more rapidly through areas of low crystal content is checked by the tendency of the solution to maintain a substantially horizontal interface. Thus, when displacement is downward and the displacing liquid is of lower gravity than the solution, if a vertical crack occurs, the displacing liquid tends to fill that fissure and thus extend a column of liquid below the interface. However, the heavier solution, which must be forced from the fissure, resists the entrance of the displacing liquid and tends to force it back and maintain a substantially horizontal interface between the two liquids. Since the gravity differential between the two liquids is necessarily limited, this tendency to maintain a horizontal interface is effective only against relatively low displacing pressures.

Hence, if the crystalline content of the mass is so great as to require high differential pressures, any cracks in the mass will become enlarged, gravity differentials between the liquids will lose their significance, the interface between the displacing liquid and the solution will be disrupted, and washing of the mass will be incomplete. Furthermore, the compacting effect of high differential pressures is undesirable in that the rate of displacement and washing is materially reduced. However, in accordance with my invention, the employment of a relatively porous mass and relatively small differential pressures permits a reasonably rapid displacement of the solution and a very complete washing of residual impurities from the mass.

My invention is differentiated from known processes, particularly filter press operations, in that at no time during the removal of the solution of impurities from the crystals does the differential pressure required in effecting displacement exceed substantially 5 lbs./sq. in. per unit (1 foot) depth of the crystalline mass, and usually at the outset does not exceed 2 lbs./sq. in. It is to be understood, however, that at some stage of the operation and particularly during the latter part thereof, the pressure may be somewhat in excess of 5 lbs./sq. in. In many instances, throughout the major portion of the displacing step, pressures are less than 2 lbs./sq. in. For example, if the displacing liquid be above the crystalline mass, in suitable apparatus, the static head of the displacing liquid (or less if the effluent liquid be taken through a throttle valve) is usually sufficient to carry out a major portion of the displacement.

On the contrary, in conventional filter press operations, pressures required to effect washing are usually in excess of 30 lbs./sq. in. for a cake thickness of the order of from 1½ to 3 inches. It is characteristic of filter press operations that the compact nature of the cake formed offers such resistance to the flow of liquid therethrough as to necessitate the building up of a large number of thin cakes during filtering. My invention is further contrasted with such operation in that the extremely porous nature of the crystalline mass or body permits satisfactory and substantially complete removal of oil, tarry material and other impurities from a mass many times the thickness of the normal filter cake, so that in the process of my invention, a relatively small number of large masses may be handled. While filter cakes are limited to thicknesses of the order of from 1½ to 3 inches, my process is applicable to crystalline masses, one foot or more, and preferably on the order of 5 feet or even greater, in depth.

My process may be further distinguished from conventional filter pressing in that both the main portion of the solution of impurities and the residual portion normally remaining in the mass at the completion of the filtering step, may be removed substantially completely in one operation.

In accordance with my invention, a variety of solvents and displacing or washing liquids, or combinations thereof, may be employed. It is essential for the economical operation of my process, that the crystallizing liquid or solvent be prevented from admixing to substantial extent with the displacing or washing liquid. This may be accomplished, for the major part, by maintaining a sufficient gravity differential between the solution and the displacing liquid. If the displacement of the solution from the crystalline mass is to take place downwardly, it is preferable that the displacing liquid have a lower specific gravity than the solution, whereas, if the displacement is to be effected upwardly, it is preferable that the displacing liquid have a higher specific gravity than the solution. By maintaining a suitable gravity differential, properly coordinated with respect to the direction of flow during displacement, it is possible to obtain a substantially horizontal interface between the solution and the displacing liquid. From the economical viewpoint, it is highly desirable to prevent substantial disruption of the interface, inasmuch as the admixture of solution and displacing liquid would necessitate the employment of considerably more displacing or washing liquid to produce the desired degree of purification. Therefore it is necessary that no substantial agitation take place during the displacement or washing operation.

Furthermore, I find that my process may be operated most advantageously if the specific gravities of the crystallizable derivative, the solution and the displacing liquid be substantially different. For example, if downward displacement is to be effected, it is desirable that the specific gravity of the solution be highest and that of the displacing liquid be lowest, while the gravity of the crystallizable derivative be intermediate but preferably approaching that of the displacing liquid. In this instance, the relatively heavy solution will exert a considerable buoyancy upon the crystals of the mass, thereby aiding in the maintenance of the uniformity and porosity of the mass. During the downward displacement and/or washing, if the gravity of the displacing liquid is less than that of the solution, and less than but approaching that of the crystals, there will be less tendency for the crystals to settle or compact upon passage of the displacing liquid thru the mass, than if the displacing liquid were of markedly lower gravity than the crystals, and at the same time a relatively uniform interface may be maintained between the displacing liquid and the solution.

On the other hand, if upward displacement is to be effected, it is desirable that the specific gravity of the solution be lowest and that of the displacing liquid be highest, while the gravity of the crystals be intermediate, but preferably approaching that of the displacing liquid. In this case, the relatively light solution will exert little buoyancy upon the crystals of the mass, thus permitting a certain degree of settling of the crystals against the upward flow of heavy displacing liquid, thereby aiding in the maintenance of a porous mass. During the upward displacement, if the gravity of the displacing liquid is greater than that of the solution and greater than but approaching that of the crystals, there will be less tendency for the crystals to compact upwardly upon passage of the displacing liquid thru the mass than if the displacing liquid has a markedly greater gravity than that of the crystals, and at the same time a relatively uniform interface may be obtained between the displacing liquid and the mother liquor.

The solvents employed in making up the crystallizing solution or mother liquor, may or may not be similar in character to the displacing and/or washing liquid. If the solvent and displacing liquid are the same, the gravity differential between the displacing liquid and the solution will depend upon the quantity of the tar derivative admixed with the solvent to form the crystallizing solution or mother liquor. In the event that the solvent liquid and the displacing liquid are of dissimilar character, it is preferable that they have sufficiently different boiling points in order that separation of one from the other at the end of the operation may be readily effected, for example, by distillation.

While I do not intend to confine myself to any one or several specific procedures for carrying out my process, the following examples will serve to illustrate the general principles of my invention.

Referring to Fig. 1 of the drawings, which illustrates apparatus suitable for carrying out the separation of impurities from crystallizable derivatives of tar by downward displacement:

From a steam jacketed stock tank 1, 45 parts, for example, of crude naphthalene having a melting point of 59° C., and distilling between 210° C. and 246° C., is withdrawn through valve-controlled pipe 2 and pumped by pump 3 through valve-controlled pipe 4 into mixing tank 5 provided with heating coil 6 and stirrer 7. Simultaneously or subsequently 55 parts, for example, of ethylene dichloride is withdrawn from solvent tank 8 by means of valve-controlled pipe 9 and pumped by pump 10 through valve-controlled pipe 4 into mixing tank 5. Herein the solvent and crude naphthalene are agitated at a temperature of, for example, 46° C., until a homogeneous solution is obtained. The resulting solution is passed from the mixing tank 5 by means of valve-controlled pipe 11 and is pumped by pump 12 thru valve-controlled pipe 13 to chilling device 14, wherein the solution is cooled until the temperature is, for example, of the order of 10° C., and a portion of the naphthalene has crystallized. This naphthalene-solvent mixture, including all of the naphthalene crystals, is passed from the chiller 14 by means of valve-controlled pipe 15 into the brine-jacketed displacement tower 16, above the screen 17. Prior to the introduction of the chilled mixture into the tower 16, air pressure is applied to brine tank 18 through valve-controlled pipe 19 provided with valved vent 19A, and brine of a specific gravity greater than that of the chilled mixture, is forced through valve-controlled pipe 20 and pipe 21 into the conical lower section of tower 16 until it barely covers the screen 17. The brine and screen 17 thus support the chilled naphthalene-solvent mixture in the tower 16. The mixture contained in the displacement tower 16 is then cooled until the temperature of the mixture is of the order of, for example, −2° C., and the desired final quantity of naphthalene has crystallized out. The cooling in the tower 16 may be effected by circulation of cold brine in the tower jacket and/or by the employment of brine coils or pipes (not shown) installed within the tower.

The mixture is preferably allowed to remain in a quiescent state within tower 16 during the final cooling period, in which time the naphthalene crystals form an agglomerate mass of appreciable mechanical strength while still retaining a high degree of free space or porosity thruout which the solvent or mother liquor is distributed. At the completion of the cooling period, 25 parts of a displacing liquid, for example, naphtha of 88° A. P. I. gravity is passed from the displacement liquid tank 22 through valve-controlled pipe 23, cooled to about −2° C. in cooling coil 24 and introduced into the displacement tower 16, by means of valve-controlled pipe 25, above the surface of the chilled naphthalene-solvent mixture contained therein. The displacing liquid is introduced in such a manner as to prevent substantial disturbance of the crystalline mass from which the impurities and solvent are to be displaced. Preferably simultaneously with the introduction of the displacing liquid at the top of tower 16, brine is withdrawn from the bottom of said tower and returned to the brine tank 18 by means of valve-controlled pipe 20. Impurities and solvent from the naphthalene mass, displaced downwardly by the incoming displacing liquid, are withdrawn from the bottom of tower 16 and passed through valve-controlled pipes 26 and 27 into receiving or heavy efflux tank 28. If necessary or desirable in order to expedite displacement, after introduction of the displacing liquid into tower 16, slight pressure may be applied to the tower, above the level of its contents, by means of valve-controlled air line 29 provided with valved vent 30. The differential or displacement pressure should preferably be maintained at less than 5 lbs./sq. in. per 1 foot depth of the mass, in order to prevent undue compacting of the naphthalene crystals and/or distortion of the interface between the mother liquor and the displacing liquid. When substantially all of the impurities and solvent (heavy efflux) has been displaced from the crystalline mass into receiving tank 28, as evidenced by a marked change in gravity or other critical property of the liquid issuing from the tower 16, the liquid thereafter withdrawn from the tower is diverted into receiving or light efflux tank 31 by closing valve-controlled pipe 27 and opening valve-controlled pipe 32. This light efflux will consist primarily of displacing liquid containing residual impurities and solvent which has been washed from the mass. The displacing or washing operation is preferably continued until the effluent from tower 16 is principally displacing liquid.

At the completion of the displacing or washing operation, the crystalline mass containing residual displacing liquid is forced upwardly and out of tower 16 through valve-controlled pipe 33 into naphthalene receiving tank 34, by means of brine introduced into the bottom of the tower from brine tank 18. If necessary or desirable, the mass contained in tower 16 may be rendered more fluid by the application of steam in the jacket surrounding said tower. The heavy efflux (impurities and solvent) in tank 28, the light efflux (impurities, solvent and displacing liquid) in tank 31, and the naphthalene containing residual displacing liquid may be withdrawn from their respective receiving tanks by means of valve-controlled pipes 35, 36 and 37 and passed to distilling apparatus (not shown) wherein the solvent, i. e., ethylene dichloride, and the displacing liquid, i. e., naphtha, may be separated and recovered from the impurities and from the purified naphthalene. There was obtained, by this process a yield of 23% of purified naphthalene having a melting point of 79° C., a distillation range of 210° C. to 214° C., substantially free of oil and white in color.

While, in the above instance, I have described the chilling of the solution of crude naphthalene and solvent from the mixing tank 5 as being effected partially in the chiller 14 and partially within the displacement tower 16, I may, if desired, pass the heated solution directly from the mixing vessel 5 to the tower 16 by means of valve-controlled by-pass 38, and effect such chilling entirely within the tower 16, or I may chill the solution entirely in the chiller 14 prior to the introduction thereof into the displacement tower 16. The latter method of operation may be carried out by pumping the heated solution directly from mixing vessel 5 through valve-controlled pipe 13, chiller 14, and valve-controlled pipe 15 into tower 16. In this instance, the chilled mixture is preferably allowed to remain in a quiescent state within tower 16 for a period of, for example, 4 hours, during which time the crystals form an agglomerate mass having appreciable mechanical strength while still retaining a high degree of free space thruout which the solution or mother liquor is distributed. Due to the gravity differential between the naphthalene and mother liquor a certain amount of upward settling of the former occurs, so that at the end of the quiescent period a lower layer of solution relatively free of crystalline naphthalene is present, which may be of the order of 30% of the volume of the total charge. This layer is drawn off from the bottom and at the same time the crystalline mass settles until, upon completion of the removal of the solution, the bottom of the crystalline mass rests upon the screen. If desired, displacing liquid may be introduced above the chilled mixture contained in the tower, prior to the withdrawal of the layer of solution from the bottom thereof. The displacement step is then carried on as above described.

The following table will serve to illustrate the results which may be obtained when operating in accordance with the general procedure described above.

*Downward displacement*

| Example | 1 | 2 | 3 | 4 | 5 |
|---|---|---|---|---|---|
| Stock | Crude naphthalene. M. P.=59° C.; distillation range 210° C.-246° C. | | | | |
| Solvent | Carbon tetrachloride. | Carbon tetrachloride. | Ethylene dichloride. | 52° naphtha | 52° naphtha. |
| Solution of stock+solvent: | | | | | |
| Percent by volume of solvent | 60 | 67 | 40 | 68 | 68. |
| Heat in mixer to ° C | 52 | 24 | 59 | 48 | 48. |
| Method of chilling stock-solvent solution | All outside of displac. tower. | All outside of displac. tower. | All within displac. tower. | All within displac. tower. | All outside of displac. tower. |
| Chilling: | | | | | |
| Chilled to— | | | | | |
| Outside tower ° C | 15 | -2 | None | None | -2. |
| Within tower do | None | None | -2 | -2 | None. |
| Displacement: | | | | | |
| Displacing liquid | 88° naphtha | 88° naphtha | 88° naphtha | 88° naphtha | 88° naphtha. |
| Volume of displacing liquid used based on charge percent | 35 | 35 | 75 | 70 | 70. |
| Temp. of displacement ° C | 15 | -2 | -2 | -2 | -2. |
| Product: | | | | | |
| Purified naphthalene— | | | | | |
| Yield based on stock percent | 15 | 22 | 38 | 52 | 67. |
| Melting point ° C | 80 | 78.3 | 78.3 | 78.5 | 78. |

Referring now to Fig. 2 of the drawings, which illustrates apparatus suitable for carrying out the separation of oils, tarry material and color bodies from tar derivatives by upward displacement:

From a steam jacketed tank 1', 30 parts, for example, of creosote oil, having a boiling range between 182° C. and 207° C., is withdrawn through valve-controlled pipe 2', and pumped by pump 3' through valve-controlled pipe 4', into mixing tank 5', provided with heating coil 6' and stirrer 7'. Simultaneously or subsequently 70 parts, for example, of ethylene dichloride is withdrawn from solvent tank 8' by means of valve-controlled pipe 9', and pumped by pump 10' through valve-controlled pipe 4' into mixing tank 5'. Herein the solvent and creosote oil containing anthracene, phenanthrene and carbazole is agitated at a temperature of, for example, 60° C., until a homogeneous solution is obtained. The resulting solution is passed from the mixing tank 5' by means of valve-controlled pipe 11', and is pumped by pump 12' through a chilling device 14', wherein the solution is cooled until the temperature is of the order of, for example, —2° C., and a mixture containing anthracene, phenanthrene and carbazole has crystallized. This mixture of solvent and crystals is passed from the chiller 14' by means of valve-controlled pipe 15', into the brine jacketed displacement tower 16', up to the level of screen 17'. The chilled mixture is allowed to remain in a quiescent state within tower 16' for a period of, for example, 6 hours, during which time the crystals form an agglomerate mass of appreciable mechanical strength while still retaining a high degree of free space or porosity. At the completion of the quiescent period, 30 parts of a displacing liquid, for example, ethylene dichloride, is passed from the displacement liquid tank 22' through valve-controlled pipe 23', cooled to about —2° C. in cooling coil 24', and introduced into the displacement tower 16' by means of valve-controlled pipe 25', below the surface of the chilled crystalline mixture contained therein. The displacing liquid is introduced in such a manner as to prevent substantial disturbance of the chilled mixture from which the impurities, chiefly oils, and solvent are to be displaced. Impurities and solvent from the crystalline mass, displaced upwardly by the incoming displacing liquid, are withdrawn from the top of tower 16', and passed through valve-controlled pipes 26' and 27', into receiving or light efflux tank 28'. If necessary or desirable, in order to expedite displacement, slight pressure may be applied to the tower 16', by introducing air, under pressure, above the displacement liquid in tank 22', by means of valve-controlled air line 29'. The differential or displacement pressure should preferably be maintained at less than 5 lbs./sq. in. per 1 foot depth of the crystalline mass, in order to prevent undue compacting of the crystals and/or distortion of the interface between the mother liquor and the displacing liquid. When substantially all of the impurities and solvent (light efflux) has been displaced from the mass into receiving tank 28', as evidenced by a marked change in gravity or other critical property of the liquid issuing from the tower 16', the liquid thereafter withdrawn from the tower is diverted into receiving or heavy efflux tank 30' by closing valve-controlled pipe 27' and opening valve-controlled pipe 31'. This heavy efflux will consist primarily of displacing liquid containing residual impurities and solvent which has been washed from the crystalline mass. The displacing or washing operation is preferably continued until the effluent from the tower 16' is principally displacing liquid.

At the completion of the displacing or washing operation, the mass containing residual displacing liquid may be withdrawn from the bottom of tower 16' by means of valve-controlled pipe 21', and passed to storage. Or, the mass may be heated, by circulating steam through the jacket of tower 16', to render it sufficiently fluid to pass through the screen 17' to suitable storage. In this case, after the crystalline mass has been rendered fluid, air pressure is applied to brine tank 18' through valve-controlled pipe 19' provided with valved vent 19' A, and brine is forced through valve-controlled pipe 20' and pipe 21' into the tower 16' beneath the crystals and solvent contained therein. The fluid mixture is forced upwardly and out of tower 16' through valve-controlled pipes 26' and 32' into receiving tank 33'. The light efflux (impurities and solvent) in tank 28', the heavy efflux (impurities, solvent and displacing liquid) in tank 30', and the crystals containing residual displacing liquid may be withdrawn from their respective receiving tanks by means of valve-controlled pipes 34', 35', and 36', and passed to distilling apparatus (not shown), wherein the solvent and the displacing liquid may be separated and recovered from the impurities and purified tar derivative. In accordance with the above process, there was produced a yield of 12% of a mixture of anthracene, phenanthrene and carbazole substantially free of oil.

While, in the above instance, I have described the chilling of the solution of cresote oil and solvent from the mixing tank 5' as being effected entirely outside of the displacement tower 16', I may, if desired, effect such chilling partially in the chiller 14', and partially in the tower 16', or I may chill the solution entirely in the displacement tower 16'. The latter method of operation may be carried out by pumping the heated solution directly from mixing vessel 5' through valve-controlled by-pass 37' and valve-controlled pipe 15' into tower 16'. The displacement tower 16' may be provided with cooling means, preferably a plurality of vertical tubes (not shown), in addition to or in place of the brine jacket shown.

While the examples given hereinbefore illustrate, in general, the results which may be obtained by displacement following a single crystallization of a tar derivative from solution, I may employ a series of two or more crystallizations, at successively lower temperatures, with the removal of crystallized material after each chilling and displacement.

In addition to the solvents and displacing or wash liquids disclosed hereinabove, there may also be employed, at suitable temperatures and pressures, other solvents such as ketones, alcohols, esters, ethers, halogenated hydrocarbons and liquefied normally gaseous hydrocarbons. The light hydrocarbons such as ethane, propane, butane and pentane and mixtures thereof, are of particular utility in my process, by reason of their very low viscosities and gravities which make them especially desirable as displacing liquids. During the displacement of mother liquor from the mass, the compacting of the crystals may be greatly reduced and the rate of displacement substantially increased by employing displacing liquids having viscosities of the order of those of the liquefied normally gaseous hydrocarbons.

In operating my process I take advantage of several physical properties which vary through rather wide limits. For example it has already been pointed out that advantage is taken of differences in specific gravity of mother liquor or solvent and displacing liquid respectively to maintain a horizontal interface therebetween during displacement. If the crystalline mixture be of such a character that relatively rapid rates of displacement are feasible, it becomes highly desirable to maintain a very considerable gravity differential between mother liquor and displacing liquid, for the reason that, in general, the tendency towards disruption of the interface and/or channeling is greater when relatively high rates of displacement are employed, and gravity differentials of considerable magnitude tend to prevent such disruption or channeling.

When, for example, ethylene dichloride is employed in making up the crystallizing solution or mother liquor and butane is used as the displacing liquid, it is possible to obtain a specific gravity differential as high as 0.65 at the temperature of displacement. Still higher gravity differentials, i. e., of the order of about 1.0 to 2.0 or higher, may be obtained by employing various other solvents or mixtures of solvents, among which may be mentioned the following:

| Solvent | Specific gravity/60° F. |
|---|---|
| Chloroform | 1.50 |
| Carbon tetrachloride | 1.60 |
| Acetone chloride | 1.83 |
| Pentachloro-ethane | 1.83 |
| Methylene bromide | 2.50 |
| Acetylene tetra bromide | 2.97 |

The relationship between the specific gravity of the mother liquor, the displacing liquid and the crystals is of considerable importance in the efficient operation of my process. It will be seen that the higher the gravity of the mother liquor, with respect to the gravity of the crystals, the greater will be the buoyant force effective upon the crystals, and this buoyant force will tend to lift the crystals from the screen (in the case of downward displacement) and therefore reduce the tendency for them to pack against the screen.

Likewise, the situation is somewhat similar with respect to the gravity differential between the crystals and the displacing liquid. After the displacement step has proceeded for a time, a portion of the mass will consist of washed crystals containing displacing liquid. If the displacing liquid (in the case of downward displacement) be of considerably lower specific gravity than that of the crystals, there is a tendency for the washed crystals to settle and pack toward the receding surface of the displacing liquid. If, however, the specific gravity of the downwardly displacing liquid be adjusted so that it is equal or even greater than that of the crystals, the tendency of the crystals to pack is largely eliminated.

Furthermore, the viscosity of the mother liquor and the displacing liquid must also be taken into consideration, for the reason that the average distance between crystals is very small, and the greater the viscosity of the liquid which must pass through these orifices, the greater will be the force required to effect displacement, and the greater will be the compressive forces acting upon the crystals of the mass. Therefore, it is particularly desirable to employ displacing liquids of relatively low viscosity, i. e., of the order of 0.1 to 5 centipoises, and preferably of the order of 0.1 to 2.0 centipoises, at the temperature of displacement.

It is to be understood that it is not possible to specify the optimum conditions for displacement, inasmuch as these conditions vary with the different crystallizable derivatives of tar to be handled. Thus, if the derivative is such that the crystals are large and relatively hard, displacement may be carried out at relatively high rates with little concern as to the packing of crystals against the screen or to undue compression of the mass. In this case it is advisable to employ as high a gravity differential as is possible in order that the rapidly advancing interface between displacing liquid and mother liquor may be kept horizontal. If, on the other hand, the crystals are soft and apt to pack, it is desirable that a high gravity differential between mother liquor and crystals be employed, in order to reduce the tendency of the crystals to pack against the screen, and, in addition, the displacing liquid is preferably of relatively high gravity to prevent the washed crystals from being unduly compacted. In this case, the gravity differential between mother liquor and displacing liquid is somewhat less than that in the preceding instance. It is desirable that the viscosity of both mother liquor and displacing liquid be relatively low, although it may not be possible in every case to employ either the lowest viscosity of mother liquor or the lowest viscosity of displacing liquid, and still retain the desired gravity differential between the two liquid phases and the crystals.

Furthermore, the displacing liquids employed in my process may be saturated with a crystallizable derivative of tar, preferably oil-free, prior to their use in the displacing step to reduce solvent power thereof for crystals of the mass. Or, the displacing liquid may contain a suspension or dispersion of fine particles of crystallizable derivative which will tend to fill incipient cracks or channels which may develop in the mass during the displacing operation.

The volume of displacing or washing liquid employed in removing the mother liquor from the crystalline mass may be of the order of from 20% to 100%, or more, by volume of the mixture charged to the displacing tower.

For brevity, in the appended claims, the terms "solvent liquid" and "displacing liquid" are to be understood to comprehend organic liquids in which oil, tarry material and color bodies are readily soluble and in which the crystallizable derivative is relatively insoluble at the temperatures employed in the displacement step of the purification process. Also, the term "crystalline mass" as employed herein and in the appended claims, comprehends a porous mass or body of crystalline naphthalene, anthracene, phenanthrene, and carbazole or other crystallizable polynuclear aromatic hydrocarbons, or mixtures thereof, containing impurities and solvent distributed therethrough.

What I claim is:

1. The process for separating impurities from a crystallizable polynuclear aromatic hydrocarbon, which comprises producing a mixture containing a crystallizable polynuclear aromatic hydrocarbon and a solvent liquid, cooling said mixture to form a crystalline mass of said polynuclear aromatic hydrocarbon containing solvent and impurities, and displacing from said mass, without substantial agitation thereof and under a relatively low differential pressure, the solvent and impurities with an organic displacing liquid.

2. The process for separating impurities from a crystallizable polynuclear aromatic hydrocarbon, which comprises producing a mixture containing a crystallizable polynuclear aromatic hydrocarbon and a solvent liquid, cooling said mixture to form a crystalline mass of said polynuclear aromatic hydrocarbon containing solvent and impurities, and displacing from said mass, without substantial agitation thereof and under a differential pressure of less than substantially 5 lbs./sq. in. per one foot depth of mass, the solvent and impurities with an organic displacing liquid.

3. The process for separating impurities from a crystallizable polynuclear aromatic hydrocarbon, which comprises adding to an impure, crystallizable polynuclear aromatic hydrocarbon a solvent liquid, cooling the admixture to form a crystalline mass of said polynuclear aromatic hydrocarbon containing solvent and impurities, and displacing from said mass, without substantial agitation thereof and under a relatively low differential pressure, the solvent and impurities with an organic displacing liquid.

4. The process for separating impurities from a crystallizable polynuclear aromatic hydrocarbon, which comprises adding to an impure, crystallizable polynuclear aromatic hydrocarbon a solvent, heating the admixture to a temperature sufficient to effect solution, cooling said solution to form a crystalline mass of said polynuclear aromatic hydrocarbon containing solvent and impurities, and displacing from said mass, without substantial agitation thereof and under a relatively low differential pressure, the solvent and impurities with an organic displacing liquid.

5. The process for separating impurities from a crystallizable polynuclear aromatic hydrocarbon, which comprises adding to an impure, crystallizable polynuclear aromatic hydrocarbon a solvent liquid, heating the admixture to a temperature sufficient to effect solution, cooling the solution to crystallize therefrom at least a portion of the crystallizable polynuclear aromatic hydrocarbon, passing the solution containing the crystallized polynuclear aromatic hydrocarbon into a displacing zone to form a crystalline mass of substantial uniformity, introducing an organic displacing liquid into said zone while preventing substantial agitation of the mass and passing said displacing liquid through said mass, without substantial agitation thereof and under a low differential pressure, to displace therefrom the solvent liquid and impurities contained therein.

6. The process for separating impurities from a crystallizable polynuclear aromatic hydrocarbon, which comprises adding to a crystallizable polynuclear aromatic hydrocarbon a solvent liquid, heating the admixture to a temperature sufficient to effect solution, passing the solution so formed into a displacing zone, cooling the solution to form a crystalline mass of said polynuclear aromatic hydrocarbon containing solvent and impurities, introducing an organic displacing liquid into said zone while preventing substantial agitation of the mass and passing said displacing liquid through said mass, without substantial agitation thereof and under a low differential pressure, to displace therefrom the solvent liquid and impurities contained therein.

7. The process for separating impurities from crude naphthalene, which comprises producing a mixture containing crude naphthalene and a solvent liquid, cooling said mixture to form a crystalline mass of naphthalene containing solvent and impurities, and displacing from said mass, without substantial agitation thereof and under a relatively low differential pressure, the solvent and impurities with an organic displacing liquid.

8. The process of claim 7 wherein the solvent liquid is a relatively heavy petroleum naphtha and the displacing liquid is a relatively light petroleum naphtha.

JAMES H. BOYD, JR.